United States Patent [19]

Sampson

[11] 4,360,952
[45] Nov. 30, 1982

[54] MEAT TENDERIZER

[76] Inventor: Jacob Sampson, 6138 N. Clark St., Chicago, Ill. 60660

[21] Appl. No.: 177,278

[22] Filed: Aug. 11, 1980

[51] Int. Cl.³ .................................................. A22C 5/00
[52] U.S. Cl. ............................................ 17/45; 17/26
[58] Field of Search .............................. 17/26, 25, 45

[56] References Cited

U.S. PATENT DOCUMENTS

| 1,991,439 | 2/1935 | Wood | 17/26 |
| 2,534,357 | 12/1950 | Lang | 17/26 |
| 2,583,199 | 1/1952 | Bakewell | 17/26 |
| 3,234,589 | 2/1966 | Haynes et al. | 17/25 |
| 4,270,244 | 6/1981 | Lo Biondo et al. | 17/26 X |

FOREIGN PATENT DOCUMENTS 179385 3/1906 Fed. Rep. of Germany .......... 17/26

Primary Examiner—Willie G. Abercrombie
Attorney, Agent, or Firm—McDougall, Hersh & Scott

[57] ABSTRACT

A meat tenderizing machine formed of a pair of spaced parallel surfaces moving in the same direction but with one surface moving at a speed differing from the other with teeth extending from the surfaces for engagement with the meat during passage between the surfaces whereby the meat is stretched during passage between said surfaces.

5 Claims, 7 Drawing Figures

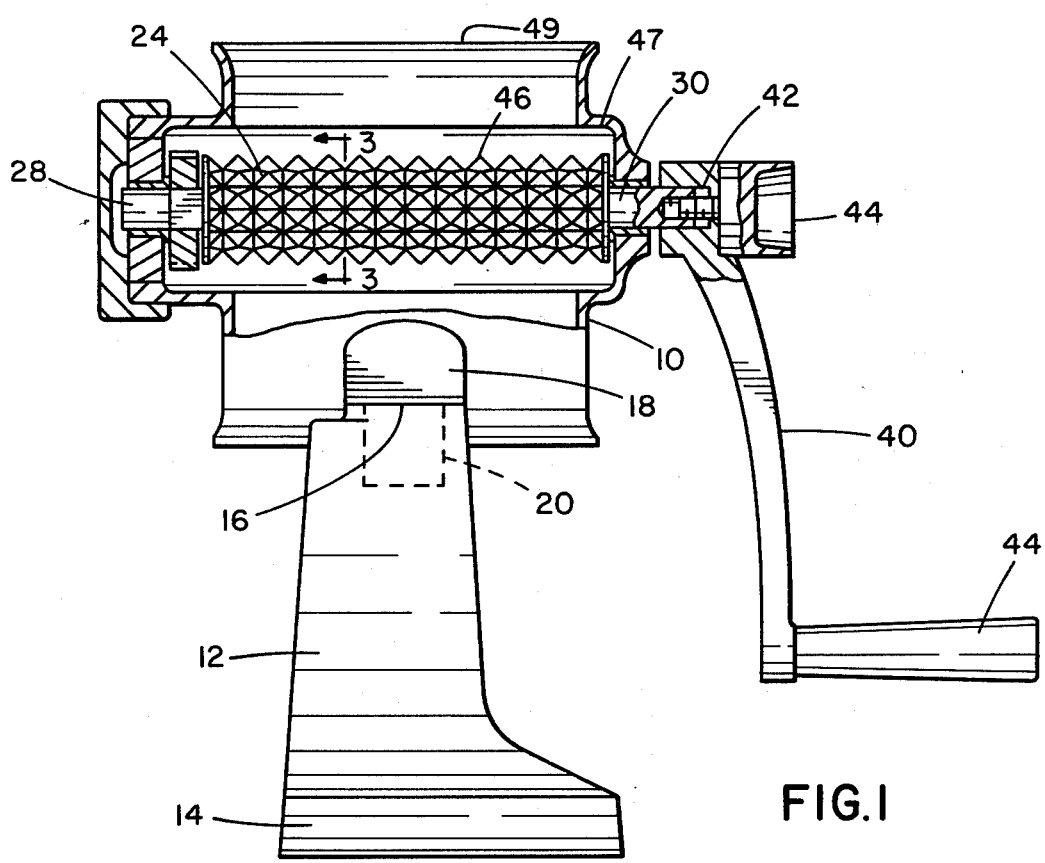
FIG.1
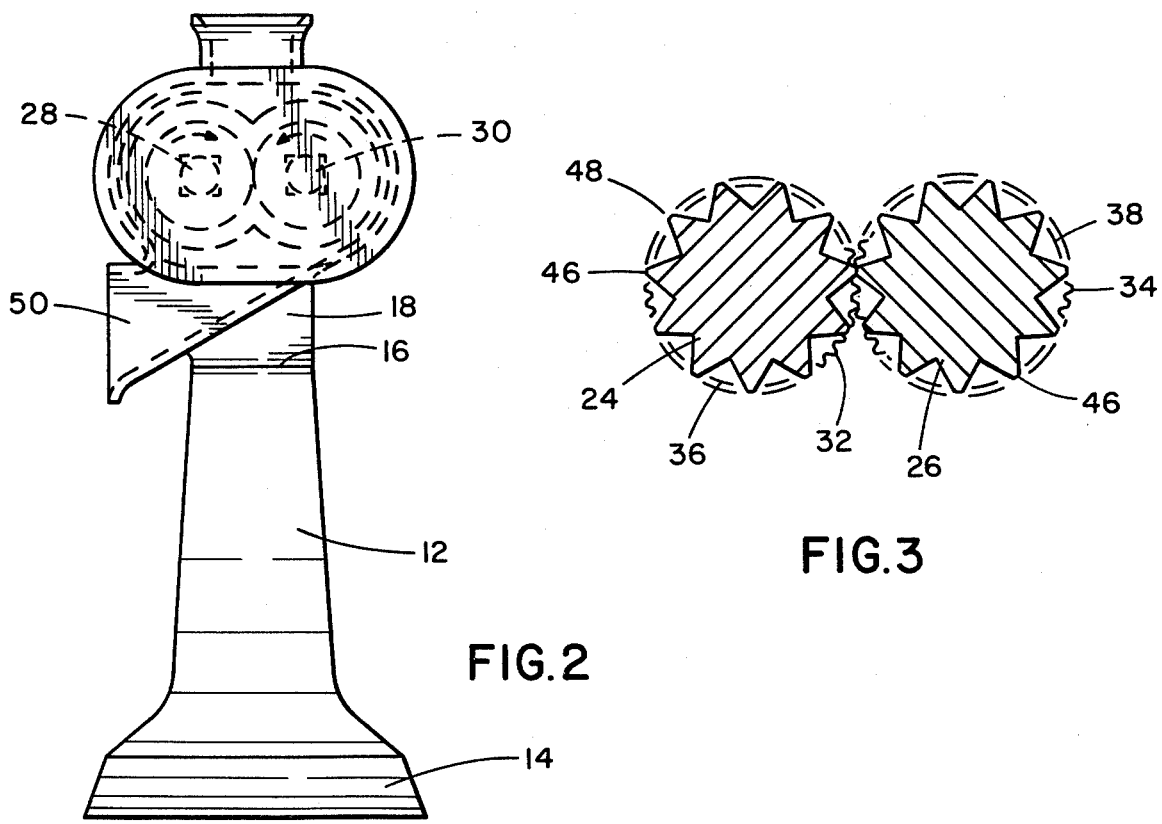
FIG.2
FIG.3

MEAT TENDERIZER

This invention relates to a method and means for tenderizing meat.

Meat, and particularly red meat such as beef, can be tenderized by ante mortem injections of proteolytic enzymes; by changing carcass suspension; by elevated pre-rigor chilling temperatures; by applying electrical current; and by post rigor aging. Such processes are limited to industrial practice connected to the slaughtering and meat packing industry, as distinguished from use at home or in the butcher shop.

There has been a recent resurgence of interest in mechanical tenderization for enhancing meat tenderness and particularly method and means that are adapted for home or butcher shope use. Such devices have, in the past, relied upon severance of the connective tissues by such processes as are referred to as blade, pin, or needle tenderization. The increase in tenderness associated with such mechanical means has been attributed to partial disconnection of connective tissues and/or severance of muscle fibers which lead to reduced resistance to shear force, mastication and swallowing of the meat. However, such severance of the connective tissues or muscle fibers allows the blood and meat juices to escape from the meat with resulting deterioration of taste and tenderness of the meat.

It is an object of this invention to provide a mechanical meat tenderization method and means which can be adapted for home use, use by butcher or slaughterhouse for tenderization of meat; which is simple in construction and easy in operation; which does not require the use of skilled labor and, therefore, is available for use by the housewife, butcher or meat packer; which does not rely on severance of muscle fibers or tissue for tenderization, and which can be made available in various sizes to enable portability for home or butcher shop usage or as a piece of fixed equipment for use in the mass production processes of the meat packing or slaughterhouse industry, and which is capable of manual or powered operation.

These and other objects and advantages of this invention will hereinafter appear and, for purposes of illustration, but not of limitation, embodiments of the invention are shown in the accompanying drawings in which:

FIG. 1 is a front elevational view of a meat tenderizing machine embodying the features of this invention;

FIG. 2 is an elevational end view of the apparatus shown in FIG. 1;

FIG. 3 is a sectional view taken along the line 3—3 of FIG. 1;

Figure 4:
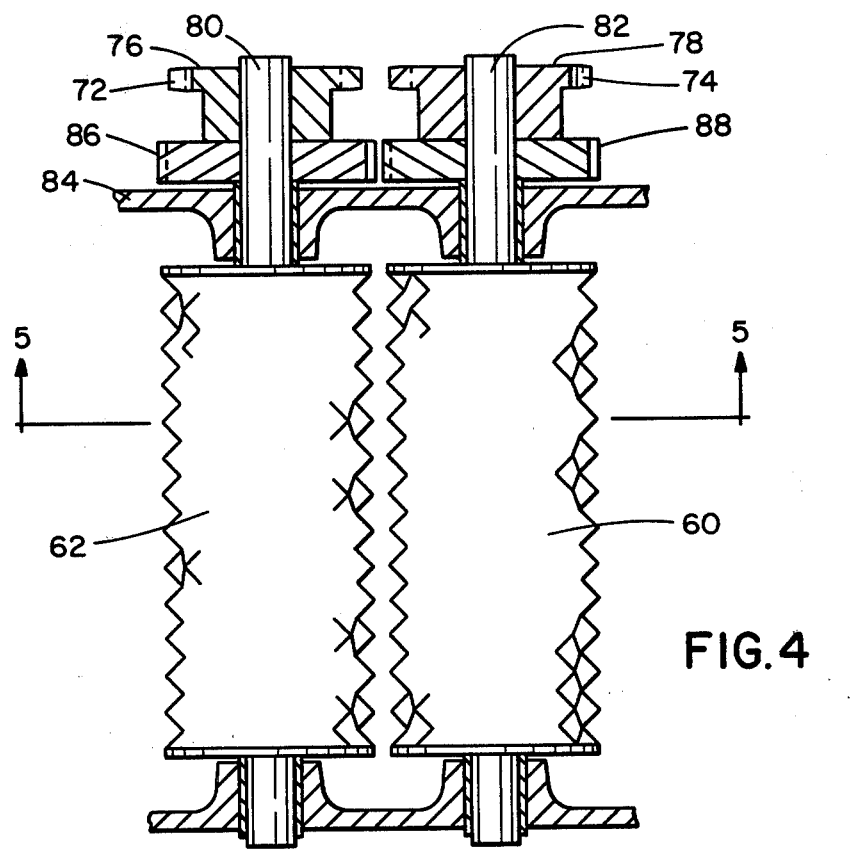
FIG. 4 is a top plan view of a modification of a meat tenderizing machine embodying the features of this invention.

Briefly described, meat tenderization in accordance with the practice of this invention comprises the passage of the meat between two spaced substantially parallel surfaces having teeth projecting from the surfaces in the direction towards each other to engage the meat therebetween and means for driving the surfaces for movement in the same direction but with one surface travelling at a linear speed that differs from the linear speed of the opposite surface, whereby the portions of the meat engaged between the projection from the opposite surface is stretched. The degree of relative movement can be varied to provide only for post mortem stretching of the meat or the amount of relative movement can be increased to provide not only for stretching the meat but also to exceed the stretchability of the meat whereby the fibers in the engaged portions of the meat are stretched beyond their breaking point for additional tenderization.

Referring now to the drawings, a hand operated model is shown in FIG. 1 in which a frame 10 is adapted removably to be mounted on a pedestal 12 having a base portion 14 which rests on a surface and a shoulder portion 16 having a central cap 18 which is adapted to seat within a cavity 20 of the base member while the base member rests upon the shoulder 16 for mounting the frame on the base.

The spaced pair of parallel surfaces is provided by a pair of rollers 24 and 26 mounted in side by side relation. The rollers are on shafts 28 and 30, the ends of which are secured for free rotational movement in journals secured in the frame members. One of the rollers is adapted to be a driving roller while the other is a driven roller operatively interconnected to the driving roller, as by means of intermeshing gears or pinions 32 and 34 respectively with the number of intermeshing gear teeth 36 on one differing from the number of gear teeth 38 on the other whereby one roller rotates at a peripheral speed which differs from the peripheral speed of the other.

In the illustrated modification wherein the machine is designed for manual operation, the shaft 30 of the driving roller extends beyond the frame member to enable a crank handle 40 to be mounted on the through extending portion 42 of the shaft 30, with a rotatable grip 44 on the end of the handle for rotating the driving shaft 30.

Each of the rollers is formed with a plurality of teeth 46 projecting from the peripheral surfaces of the rollers in fairly closely spaced apart relation. The teeth may be in the form of pyramidal projections with the roller forming the base surface and tapering to an apex at their outer ends, preferably with the ends being flattened at the apex 48. Instead, the projections may be of other configurations such as frustoconical sections and the like. The projections are dimensioned to have a height preferably slightly less than one-half the spaced relation between the peripheral surfaces between the rollers so that, on the occasion that the teeth are aligned, they will at most just touch each other.

The frame 10 supports a housing 47 which encloses the rollers except for an elongate inlet 49 at the top in vertical alignment with the space between the rollers, and an outlet 50 at the bottom side, forming a continuation of a downwardly inclined bottom wall of the housing immediately underlying the rollers. In operation, the meat is introduced into the housing through the inlet at the top for engagement by the rollers and it is delivered from the outlet at the bottom side after it has passed between the rollers.

In a specific reduction to practice, the two rollers are of a diameter of 1¼ inch, each of which has 11 axial circumferentially spaced apart rows of teeth projecting from the peripheral surface for a distance of 0.135 inches with the teeth in each row in side by side closely spaced relation. The driving gear has 22 teeth which mesh with the 24 teeth of the driven gear to provide a ratio of 1.09 to 1 in relation to the surface speed between the rollers.

Instead of making use of a hand crank for actuating the driving roller, use can be made of other conventional means for rotating the driving rollers such, for example, as an electrical motor operatively engaged with the shaft of the driving roller or use can be made of a belt drive when an enlarged version of the device is employed in slaughterhouse or in meat packing operations. Such power operated means can be controlled by an on and off switch located on or near the machine.

As the meat passes between the rollers, the meat will become engaged by the teeth. Since the surface of one roller is moving at a peripheral speed greater than the other, the engaged portions of the meat will be stretched during passage between the rollers. The amount of relative movement between the surfaces can be varied by increase or decrease in the ratio of the number of intermeshing gear teeth with respect to the number of engaged gear teeth in the other roller. The ratio can be increased if desired to supplement the stretching action with a tearing action for breaking the connective tissues of the meat.

Figure 5:
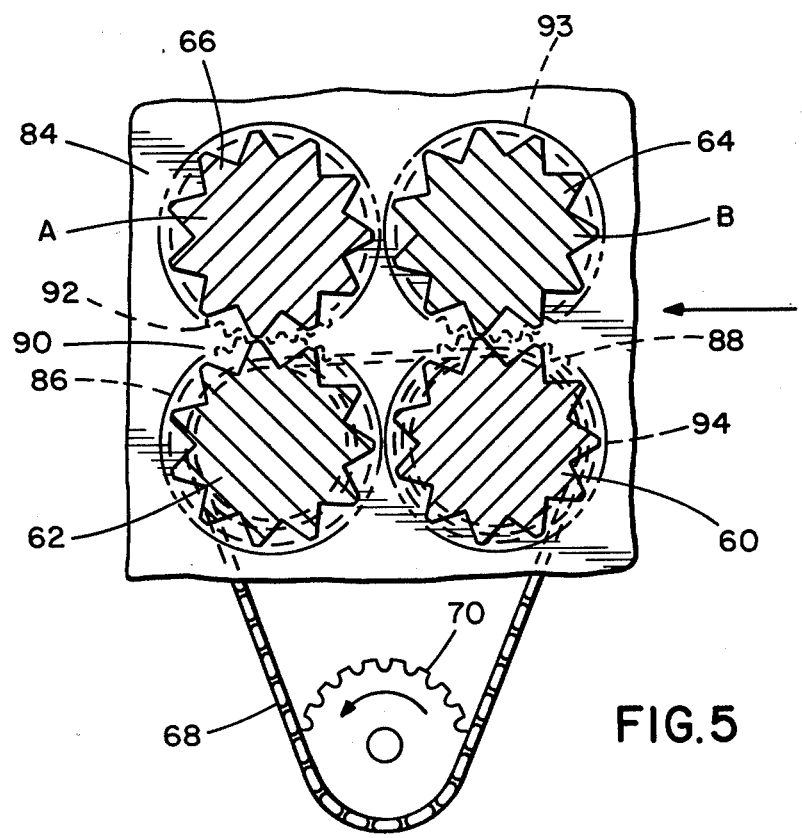
FIG. 5 is an end elevational view of the meat tenderizing machine shown in FIG. 4, with portions omitted to show the roller arrangment.

In the modification shown in FIGS. 4 and 5, two longitudinally spaced apart pairs of rollers A and B are mounted in tandem with the lower roller 60 and 62 in each pair constituting the driving rollers while the upper roller 64 and 66 in each pair represente the driven rollers.

The two pairs of rollers A and B are spaced one from the other longitudinally and the rollers in each pair are spaced one from the other vertically by an amount ranging from a mere touching relation between the apices of the projecting teeth when aligned to a spaced relation between the teeth to as much as ¼ to ½ inch depending somewhat on the thickness of the slab of meat to be processed between the rollers.

In the illustrated modification, the two bottom rollers 60 and 62 are adapted to be driven by an endless chain 68 which operates about a sprocket 70 mounted on the end of a motor shaft (not shown) with the endless chain being trained for meshing engagement with the teeth 72 and 74 of sprockets 76 and 78 secured onto the ends of the shafts 80 and 82 of rollers 60 and 62.

Beyond the housing 84, each shaft 80 and 82 mounts a gear 86 and 88 with gear teeth 90, in which the gear teeth of one gear meshes with the gear teeth of the gear 92 secured to the shaft of the other roller in the pair for transmitting rotational movement from the driving roller to the driven roller.

The rollers and teeth 94 projecting from the surfaces are as described in the preceding modification. The number of gear teeth in the driving roller exceeds the number of gear teeth in the driven roller as by a ratio of 22 to 20 to provide for the differential surface speeds between the rollers in each pair.

In operation, the motor is energized to drive the rollers. The meat is fed horizontally between the rollers of one pair whereby the meat is gripped to advance the strip of meat to between the rollers of the next pair. The flow is in the horizontal direction as indicated by the arrow in FIG. 5.

It will be understood that the rollers can be arranged for vertical flow of the meat during processing therethrough and that the number of pairs of aligned rollers can be increased, where desired for greater tenderization, without departing from the spirit of the invention.

Figure 6:
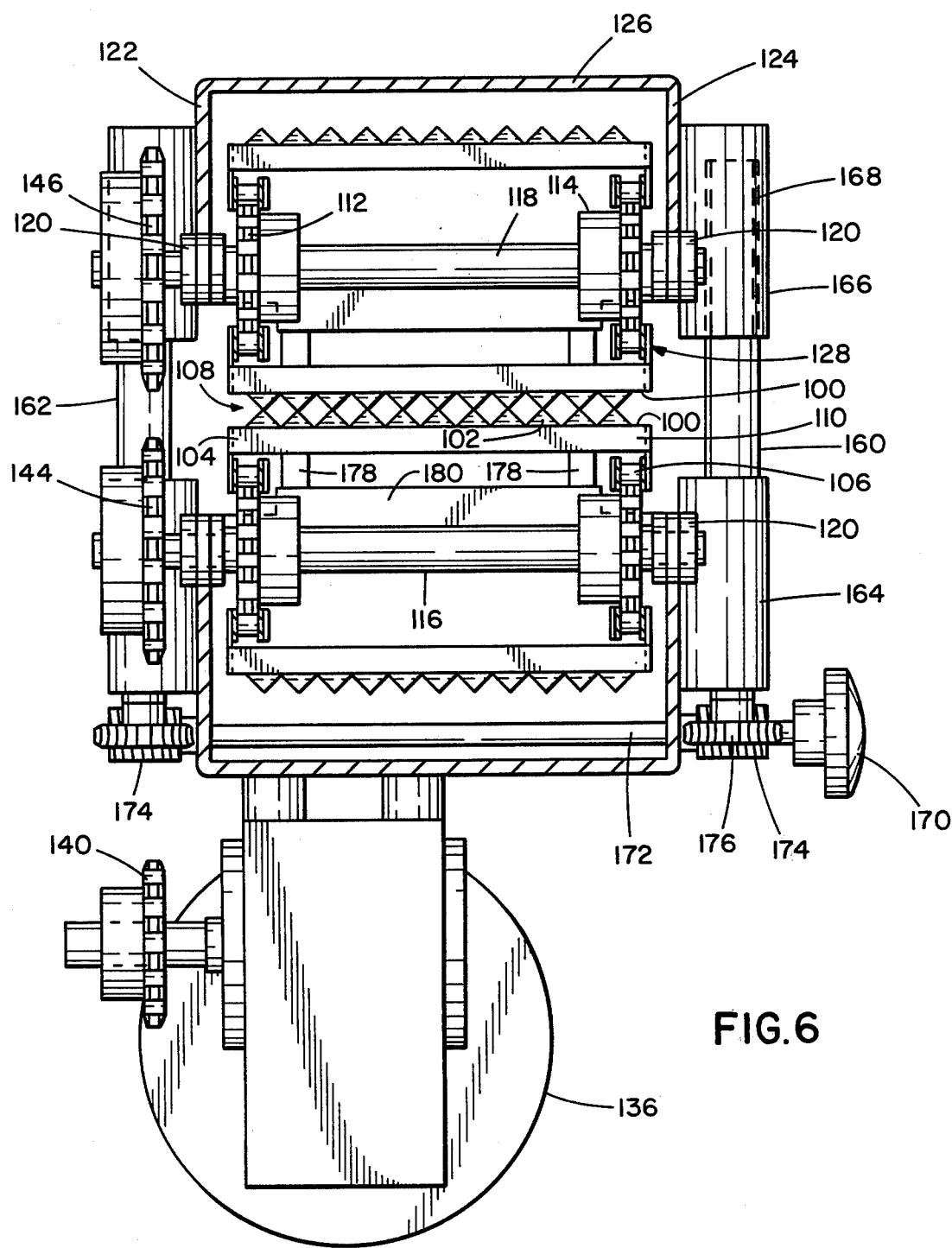
FIG. 6 is an end elevational view of a still further modification of the apparatus of this invention.
Figure 7:
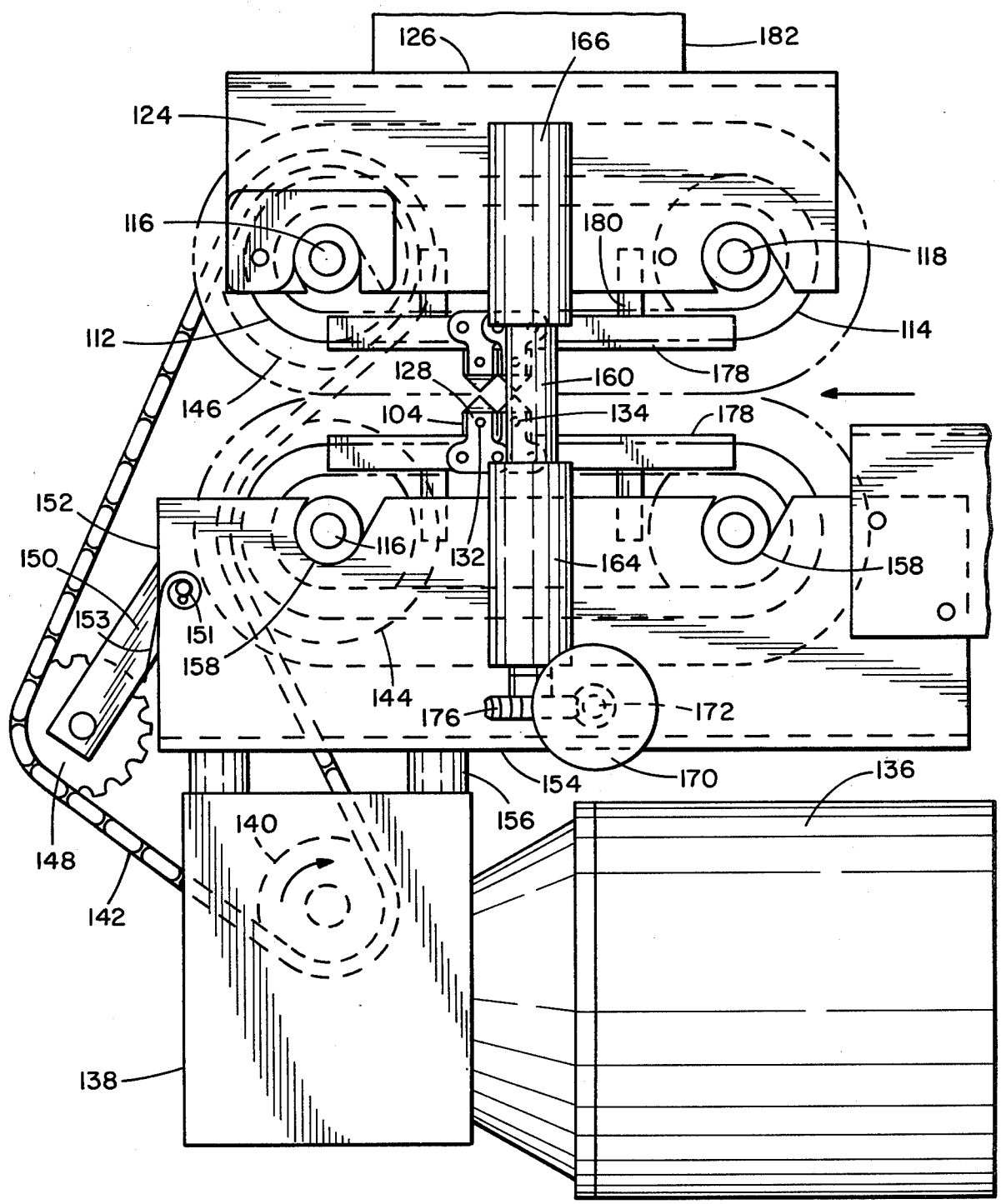
FIG. 7 is a side elevational view of the apparatus shown in FIG. 6.

In the modification shown in FIGS. 6 and 7, the surfaces 100 from which the teeth 102 extend comprise a series of elongate plates 104 arranged in closely spaced apart parallel relation to extend crosswise between a pair of laterally spaced apart endless chains 106, with one surface in spaced parallel relation with the other surface during adjacent runs of the chains to define a meat tenderizing area 108 therebetween which may be extended, depending somewhat on the length of the adjacent parallel runs of the chains.

Referring now to FIGS. 6 and 7 of the drawings, the plates 110 are in the form of elongate, narrow metal members which extend crosswise between a pair of laterally spaced apart endless chains 106 which operate about longitudinally spaced sprockets 112 and 114 keyed onto longitudinally spaced apart crosswise extending shafts 116 and 118 respectively for rotational movement therewith. Journals 120, mounted to the side walls 122 and 124 of an enclosure 126, support the lateral end portions of the shafts 116 and 118 for free rotational movement. The plates 110 are secured at their ends to the links 128 of the chain 106 so that the plates will function as a moving surface as the chains travel about the sprockets. For this purpose, as shown in FIGS. 6 and 7, brackets 128 are secured by bolt or bolt and nut members 132 to one side of the chain links with a portion of the bracket 128 extending outwardly beyond the chain links for attachment by bolt members 134, or other fastening means, to the ends of the crosswise extending plates 110 to define a portion of the surface therebetween. Depending upon the length of the plates, the plates can be secured to each link or to alternate links of the link chain with the plates being spaced to define a substantially continuous surface along a straight run of the chain but with sufficient space (about ⅛-¼") between the plates to enable the plates to be carried by the chains about a circular path during travel about the sprockets. The plates are provided with one or more crosswise extending rows of teeth 102 of the types described, which project outwardly from the surface.

The apparatus of FIGS. 6 and 7 makes use of two plate assemblies of the type described with one assembly secured in spaced parallel relation to the other with the spacing between the plates corresponding to the spacing between the surface of the roller pairs as described with reference to FIGS. 1 to 5 of the drawings, i.e. with the surfaces of the adjacent runs spaced one from the other by an amount corresponding to and preferably slightly less than the combined height of the teeth 102 projecting outwardly from the surfaces of the plates.

The shafts 116 and 118 are adapted to be rotated by an actuating means which, in the illustrated modification, comprises a variable speed electric motor 136 but, instead, use can be made of a belt drive or the like. The motor shaft operates through a gear box 138 to rotate a sprocket 140 at low speed and with high torque. The sprocket 140 is interconnected by an endless drive chain 142 which wraps around sprockets 144 and 146 fixed onto portions of the driving shafts 116 of the two units which extend beyond the side walls of the housing in a manner to rotate the shafts in the opposite directions. A tensioning roller or sprocket 148 is positioned to engage the chain 142 in a manner to maintain a desired tensioned relationship for operation. The roller 148 is mounted for free rotational movement on the end portion of a bracket arm 150 mounted for pivotal movement on a pivot pin 151 secured to the frame with means such as a torsion spring 153 constantly urging the arm in the direction away from the frame for self adjustment of chain tension while permitting variation in the spaced relation between the surfaces to accomodate meat slabs of different thicknesses.

For this purpose, the lower section is fixed to the frame while the upper section is supported from the lower section in a manner to permit relative movement of the unit in the direction toward and away from the lower section.

As illustrated in the drawings, vertically aligned tubular members 164-166 are secured to the outside of the front and back walls of the housings intermediate the ends. The upper tubular members 166 secured to the upper housing are in the form of elongate threaded nut members while the passage through the tubular members 164 secured to the lower housing are of a dimension to enable free turning movement of vertically disposed threaded rods 160 and 162 which extend through the lower tubular members 164 into threaded engagement with the elongate nut members 166. Thus the upper section can be displaced vertically in the direction toward and away from the lower section in response to turning movement of the threaded rods 160 and 162 in one direction or the other.

Rotational movement is transmitted to the threaded rods 160 and 162 by means of a knob 170 fixed onto the end of a shaft 172 that extends crosswise below the lower section with worms 174 fixed to portions of the shaft for engagement with worm gears 176 fixed to the lower end portion of each of the rods 160 and 162. Thus, by operating the knob, the rods can be caused to rotate together in one direction or the other to raise or lower the upper section relative to the lower section. Such relative movement is permitted by the chain drive 142 operating between the driving sprockets 144 and 146 and the tensioning means 148. The surfaces 100 defined by the plates 100 are substantially at the same level to define an elongate run between adjacent surfaces into which the meat is fed for passage between the surfaces during tenderizing treatment. Since the length of the run can vary from a very short run to a long run, there is a tendency for the surfaces to separate through the meat portions which are not directly supported by the sprockets. In order to maintain the desired spaced relation throughout the run, it is desirable to provide supports for the chains or the plates in the region of the adjacent runs. In the illustrated modification, such supports are provided by rails 178 which extend lengthwise alongside the laterally spaced sprockets immediately below the bottom side of the plates and at a constant level to support the plates in a manner to militate against deflection under load. The rails 178 are fixed onto the bar 180 which are secured to form a part of the frame. Thus the guide rails 178 form a part of each section for movement as a unit.

The desired differential in linear support between the surfaces can be effected in a number of ways, such as in the manner previously described wherein the number of teeth in one driving sprocket of one section differs from the number of teeth in the driving sprocket of the other section. Such differential can be provided in the number of teeth in the sprockets 144 and 146 engaged by the driving chain or in the number of teeth in the sprockets 112 as between one section and the other. Instead, the desired differential in linear speed can be derived from the use of a driving gear in one section having a diameter differing from the diameter of the driving gear in the other section.

Where, as in the described modification, the surfaces are capable of variation in the spaced relation to accommodate the processing of meats of different thicknesses, the dimensional characteristics of the teeth 102 and the spaced relation between the surfaces 100 are not significant since the spacing between the surfaces can be adjusted to accommodate surfaces having teeth of different lengths and surfaces of different spacing one from the other.

In use, the chain 142 is actuated by driving means 136 to rotate the driving gear of each section. In order to have the adjacent surfaces moving in the same direction along the adjacent runs, the chain is wrapped around the gears to turn the shafts in opposite directions.

The link chains 106 in each section interconnects the driving and driven shafts so that they rotate together at the same speed to define surfaces between the sections wherein the adjacent surfaces of the run move substantially in spaced parallel relation. The slab or slabs of meat are fed at one end into the space between the surfaces for engagement by the teeth whereby the slab of meat is displaced with the surfaces and tenderized by stretching during passage therethrough.

While not essential, tenderization of the meat is accelerated by agitation of one or both of the surfaces while the meat is engaged during passage therebetween. For this purpose, use can be made of an agitator of conventional construction and operation attached to one or both frames supporting said surfaces as represented by the agitator 182 mounted on the upper frame 124 in FIG. 7 in which the agitator is one operating or orbital resonance of an eccentric mounted on a shaft rotating at high speed or one embodying a shaker mechanism operating in reciprocal movement at high speed.

It will be understood that changes may be made in the details of construction, arrangement and operation without departing from the spirit of the invention, especially as defined in the following claims.

I claim:

1. A method of tenderizing meat comprising passing the meat between a pair of surfaces in spaced parallel relation having teeth with flattened ends to minimize perforations projecting from the facing surfaces by an amount to engage the opposite sides of the meat during passage between said surfaces without projecting completely through the meat, and moving the surfaces in the same direction but with one surface moving at a linear speed different from the other to stretch the meat between the engaged portions of the meat during passage between the surfaces.

2. A method of tenderizing meat as claimed in claim 1 in which the surfaces comprise a pair of rollers mounted for rotational movement about spaced parallel axes.

3. A method of tenderizing meat as claimed in claim 1 in which the teeth comprise truncated members having their base of larger dimension at the surface.

4. A method of tenderizing meat as claimed in claim 1 in which the surfaces are in the form of endless members mounted for movement about longitudinally spaced rollers to provide lengthwise runs between adjacent surfaces travelling in the same direction.

5. The method of tenderizing meat as claimed in claim 1 which includes the step of subjecting the engaged portions of the meat to vibratory agitation during passage of the meat between the surfaces.

* * * * *